United States Patent
Klingler

(12) 
(10) Patent No.: US 6,347,554 B1
(45) Date of Patent: Feb. 19, 2002

(54) TORQUE TRANSDUCER ASSEMBLY

(75) Inventor: Phillip L. Klingler, Bryan, OH (US)

(73) Assignee: C.E. Electronics, Inc., Bryan, OH (US)

( * ) Notice: Subject to any disclaimer, the term of this patent is extended or adjusted under 35 U.S.C. 154(b) by 0 days.

(21) Appl. No.: 09/515,347

(22) Filed: Feb. 29, 2000

(51) Int. Cl.[7] .................................................. G01L 3/00
(52) U.S. Cl. .................................................. 73/862.08
(58) Field of Search .................... 73/862.21–862.25, 73/862.26, 862.08, 862.191, 862.29, 862.31, 862.321, 862.322, 761; 173/12

(56) References Cited

U.S. PATENT DOCUMENTS

| | | | |
|---|---|---|---|
| 4,281,538 A | | 8/1981 | Dudek |
| 4,359,906 A | * | 11/1982 | Cordey .................... 73/862.23 |
| 5,014,793 A | * | 5/1991 | Germanton et al. .......... 173/12 |
| 5,172,774 A | | 12/1992 | Melrose |
| 5,567,886 A | * | 10/1996 | Kettner .................... 73/862.23 |
| 5,597,964 A | | 1/1997 | Binns |
| 5,692,418 A | | 12/1997 | Burner |
| 5,738,177 A | | 4/1998 | Schell et al. |
| 5,750,932 A | | 5/1998 | Hansson |

* cited by examiner

Primary Examiner—Benjamin R. Fuller
Assistant Examiner—Jewel V. Thompson
(74) Attorney, Agent, or Firm—Emch, Schaffer, Schaub & Porcello Co., L.P.A.

(57) ABSTRACT

This assembly is a torque measuring device that measures the torque output a tool is producing. A hollow torsion tube connects the tool to a reaction arm through the assembly. A torque transducer is attached to the side of the torsion tube. The ends of the torque transducer are attached in a way that transfers the torque output of the tool to the torsion tube. The transducer produces an electrical signal directly proportional to the amount of twisting that occurs in the torsion tube and transducer. A handle also is attached to the torsion tube in a way that allows the handle to rotate 360° around the torsion tube. Since the operator holds the handle instead of the tool, the operators influence on the tool's torque output is removed, increasing the accuracy of the device.

17 Claims, 3 Drawing Sheets

TORQUE TRANSDUCER ASSEMBLY

TECHNICAL FIELD

This invention relates to a torque transducer assembly that attaches between a power tool or a rotating machine and a torque reaction device. This assembly provides a means for precisely measuring the torque output the tool is producing.

BACKGROUND OF THE INVENTION

Preciseness, consistency and reporting of torque are very important to mass production operations, such as automobile assembly plants. Power tool applied torque to threaded fasteners must be consistent and within specifications. Industry typically incorporates the torque measuring or controlling device into the power tool. This often has been unsatisfactory because these attempts often lead to large, bulky, difficult to repair and expensive tools.

For example, in a typical power tool, torque is applied by a power source through a series of shafts and gear sets to the output spindle. This torque transducer measures the torque on the spindle through a torsionally resilient device strain gauges, a gear case, planet gears and ring gears. This circuitous path is expensive and difficult to incorporate into small power tools. Wear on the "drive train" components can effect the accuracy of the torque output readings. These devices really do not measure the torque the spindle of the tool is producing.

BRIEF SUMMARY OF THE INVENTION

This assembly is a fixture that houses a torque measuring device. The assembly attaches to a torque reaction device such as a work station arm. A power tool attaches to the opposite end of the assembly. The assembly includes a hollow torsion tube that connects the tool to the reaction arm through the assembly. A torque transducer is attached to the side of the torsion tube. As the tool reacts to torque, it twists and this reaction is transferred to the torsion tube. The end of the torsion tube that is attached to the reaction device is fixed and therefore is not able to rotate. The transducer produces an electrical signal proportional to the amount of twisting that occurs. This signal is directly proportional to the output torque that the tool is producing.

A first end of the torque transducer is fixed to the torsion tube and unable to twist with respect to the torque output of the tool. A second end of the torque transducer is attached to the torsion tube and free to twist with respect to the torque output of the tool. The first end of the transducer is fixed adjacent the torque reaction device end of the torsion tube and the second end of the transducer is fixed adjacent the tool end of the torsion tube.

Since the reaction arm is large and heavy with respect to the tool, the first end of the transducer is unable to twist while the second end of the transducer is free to twist with the torque the tool is producing. In theory, the opposite is true except that the reaction arm end of the torsion tube does not twist because of the mass of the reaction arm.

The housing of the assembly is allowed to rotate nearly 360° around the torsion tube on bearings or bushings. A handle is also attached to the housing. Since the operator holds the handle instead of the tool, the operators influence on the tool's torque reaction in removed increasing the accuracy of the device. Flanges at the top and bottom of the torsion tube minimize the influence of thrust and side to side loading on the torque reading as well. Since the torsion tube is hollow, power for the tool (be it electrical or pneumatic) may pass through the center of the tool.

DETAILED DESCRIPTION OF THE INVENTION

Figure 1:
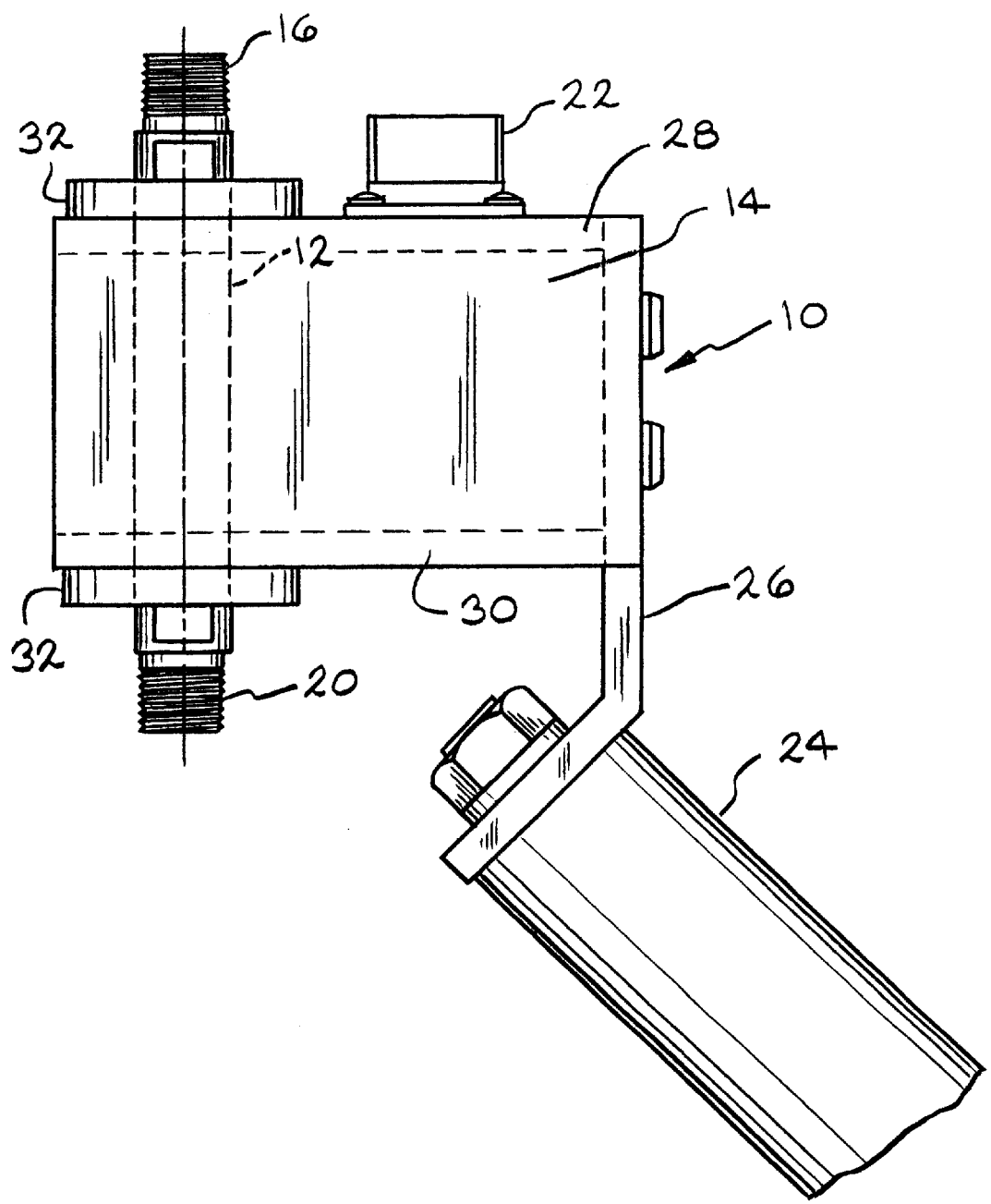
FIG. 1 is a schematic view of the housing of the assembly of this invention.

FIG. 1 shows torque transducer assembly 10 located outside a tool housing comprising hollow torsion tube 12 and housing cover 14 that rotates up to 360° around torsion tube 12. First end 16 of torsion tube 12 attaches to reaction arm 18. Second end 20 attaches to a tool or a means connected to a tool. Port 22 provides for passing electrical signals into and out of the interior of housing 14. Ergonomic handle 24 attaches to the assembly via handle bracket 26. Top bracket 28 and bottom bracket 30 are affixed to handle bracket 26. Flange bearings 32 allow torsion tube 12 to rotate 360° around handle 24 and housing 14. Brackets 28 and 30 have apertures therein and flange bearings 32 are located in the apertures separating torsion tube 12 from brackets 28 and 30. Housing cover 14 attaches to handle bracket 26 and brackets 28 and 30. When engaging the brackets, housing cover 14 rotates 360° with handle 24. Housing cover 24 may snap or slide into place on the brackets. Fastening means such as machine screws or tensioning also may be used.

Regarding port 22, the electrical signals typically are sent to a microprocessor. The microprocessor uses the electrical signals converted to torque values to determine what action, if any, should be taken based on the current state of the torque. The microprocessor may use the torque values for monitoring, controlling, displaying and recording the final torque output of the tool. The values also may be used to conduct an actual count, to verify proper fastening, to conduct a count shut down of the tool, as a warning, as a fault counter and the like. The assembly constantly transmits torque signals over its port. An external device like a PC or external control system can monitor this information and determine if any action should occur. Then the PC can download these new settings into the EEPROM.

Figure 2:
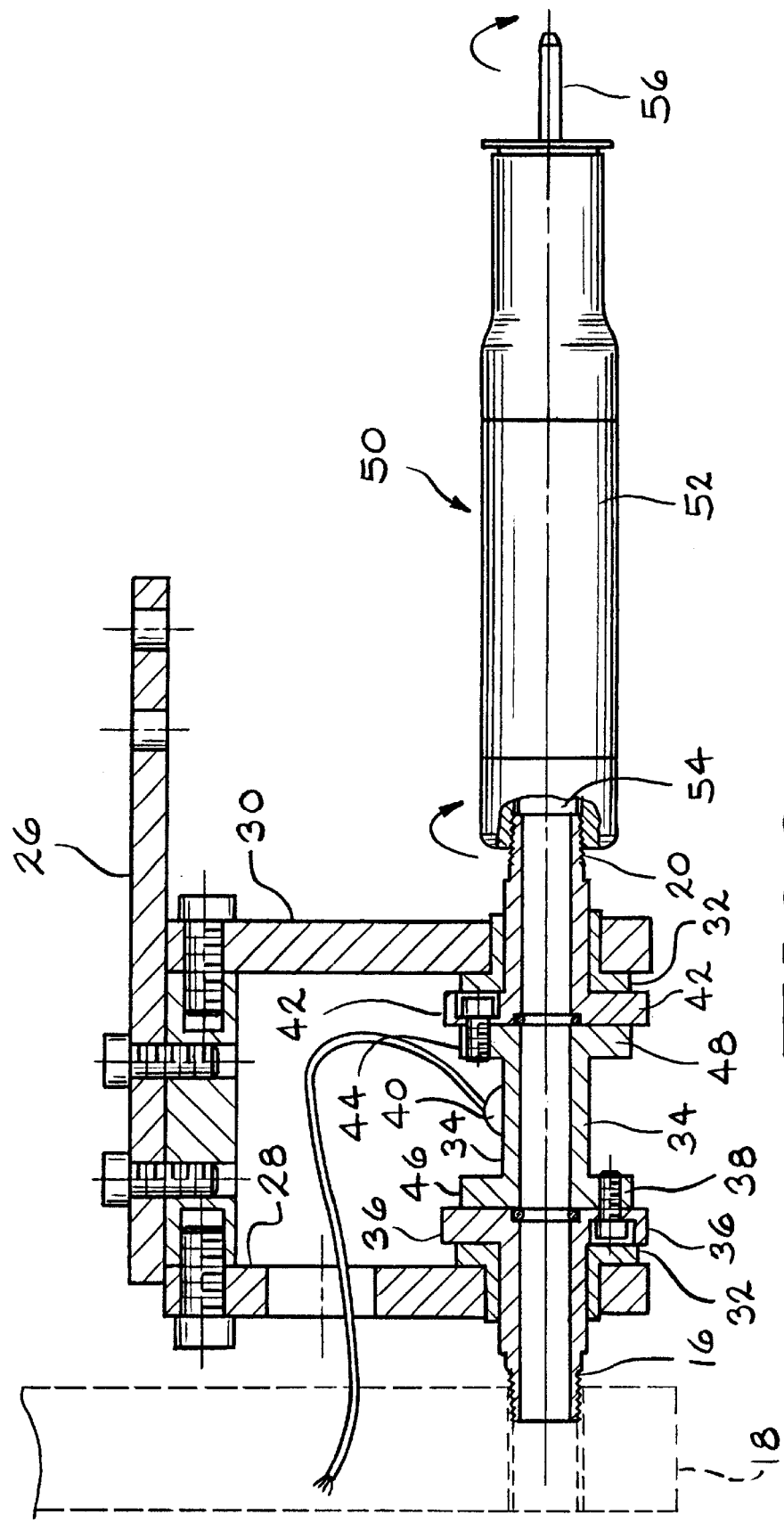
FIG. 2 is a schematic view of the interior of the housing showing the torsion tube and torque transducer. It also shows a tool coupled thereto.

FIG. 2 shows the interior of assembly 10 and hollow torsion tube 12 in greater detail. Torque transducer 34 attaches to the outer walls of torsion tube 12 near first end 16. Torque reaction device 18 is fastened to end 16 of torsion tube 12. Torsion tube 12 includes adaptor 36. Fastener 38 secures adapter 36 to torque transducer 34. While we only show one fastener 36, more than one fastener may be used. Typically, three fasteners 36 are employed. Torsion strain gauge 40 attaches to transducer 34.

Torque transducer 34 also attaches to the outer walls of torsion tube 12 near second end 20. Tool 50 is fastened to end 20 of torsion tube 12. Torsion tube 12 also includes adaptor 42. At least one fastener 44 secures adaptor 42 to torque transducer 34.

As a result, first end 46 of transducer 34 is stationary with respect to tool and second end 48 of transducer 34 is free to twist with the torque output of tool 50.

FIG. 2 also shows conventional electrical tool 50 which produces torque during operation. Tool 50 includes tool housing 52 and electric connector 54. Tool 50 also includes spindle 56. Connector 54 connects tool 50 to second end 20 of torsion tube 12. Torque transducer 34 directly engages torsion tube 12. While assembly 10 was designed for a pneumatic tool, tool 50 may be an electric, hydraulic or pneumatic tool. Since the operator holds handle 24 instead of tool 50, the operators influence on the tool's torque output is removed, increasing the accuracy of the device.

Figure 3:
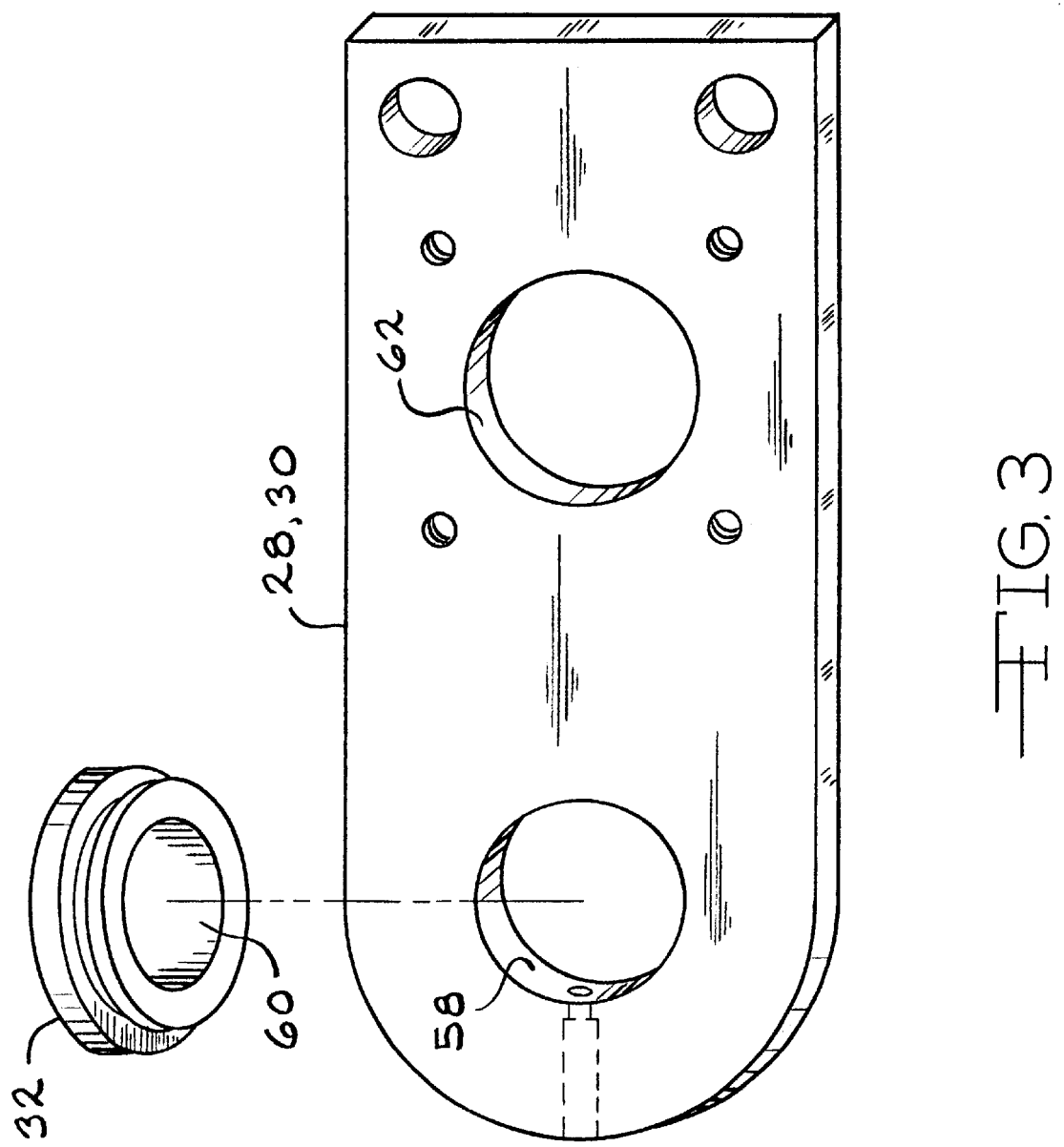
FIG. 3 shows a bracket and flange bearing in greater detail.

FIG. 3 shows brackets 28 and 30, and flange bearing 32 is greater detail. Bracket 28 has aperture 58 therethrough and bearing 32 has aperture 60 therethrough. Torsion tube 12 passes through apertures 58 and 60. Bracket 28 also includes aperture 62 which allows port 22 to pass therethrough.

The tools with this invention are conventional and well known in the art. U.S. Pat. No. 5,377,578 illustrates air tools and related components which one could use with the assembly of the invention. U.S. Pat. Nos. 5,567,886 and 5,592,396 disclose other fluid driven tools using compressed air, electronics or mechanical advantage which depend upon torque to perform their operation. The assembly of my invention is used with no internal modification to the tool.

In addition to these embodiments, persons skilled in the art can see that numerous modifications and changes may be made to the above invention without departing from the intended spirit and scope thereof.

I claim:

1. A torque transducer assembly located outside a tool housing for measuring the torque output of the tool comprising:

a hollow torsion tube;

a torque reaction device attached to a first end of the torsion tube wherein the first end of the torsion tube is fixed and unable to rotate or twist;

a tool attached to a second end of the torsion tube;

a torque transducer mounted to a side of the torsion tube;

a first end of the torque transducer is attached to the side of the torsion tube and unable to twist with respect to the torque output of the tool; and a second end of the torque transducer is attached to the torsion tube and free to twist with respect to the torque output of the tool.

2. An assembly according to claim 1 wherein the first end of the transducer is adjacent the first end of the torsion tube and the second end of the transducer is adjacent the second end of the torsion tube.

3. An assembly according to claim 1 wherein the torque reaction device is a work station arm.

4. An assembly according to claim 1 wherein the torque transducer is at least one torsional strain responsive signal generating element.

5. An assembly according to claim 1 wherein the torque transducer is at least one strain gauge.

6. An assembly according to claim 5 wherein the strain gauge is electrically connected to a Whetstone bridge network.

7. An assembly according to claim 1 including a handle free to rotate 360° around the torsion tube.

8. An assembly according to claim 7 wherein the handle includes at least one bracket wherein the bracket has an aperture therethrough and wherein the torsion tube passes through the aperture.

9. An assembly according to claim 8 including a flange bearing located between the torsion tube and the aperture of the bracket.

10. An assembly according to claim 9 wherein the flange bearing has an aperture and the torsion tube passes through the aperture of the flange bearing.

11. An assembly according to claim 7 wherein the handle includes at least two brackets wherein each of the brackets has an aperture therethrough and wherein the torsion tube passes through the apertures.

12. An assembly according to claim 7 including a housing mounted on the handle wherein the housing is free to rotate 360° around the torsion tube.

13. A process for measuring the torque output of a tool with a torque transducer assembly located outside a tool housing comprising the steps of:

providing a hollow torsion tube;

attaching a torque reaction device to a first end of the torsion tube wherein the first end of the torsion tube is fixed and unable to twist;

attaching a tool to a second end of the torsion tube;

mounting a torque transducer having a first end and a second end to a side of the torsion tube so that the first end of the torque transducer is unable to twist; and measuring the torque output of the tool with the torque transducer attached to the torsion tube.

14. A process according to claim 13 including the step of attaching the second end of the torque transducer adjacent the second end of the torsion tube.

15. A process according to claim 14 including the steps of twisting the second end of the torsion tube and twisting the second end of the torque transducer with the torque output of the tool.

16. A process according to claim 13 including the step of holding the assembly with a handle that is free to rotate 360° around the torsion tube.

17. A process according to claim 16 including the step of rotating the handle 360° around the torsion tube.

* * * * *